United States Patent
Susitaival et al.

(10) Patent No.: US 10,880,793 B2
(45) Date of Patent: Dec. 29, 2020

(54) LINK SWITCH IN A WIRELESS COMMUNICATION SYSTEM

(71) Applicant: Telefonaktiebolaget LM Ericsson (publ), Stockholm (SE)

(72) Inventors: Riikka Susitaival, Helsinki (FI); Icaro L. J. Da Silva, Solna (SE); Janne Peisa, Espoo (FI); Edgar Ramos, Kirkkonummi (FI); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 16/319,375

(22) PCT Filed: Dec. 21, 2017

(86) PCT No.: PCT/SE2017/051326
§ 371 (c)(1),
(2) Date: Jan. 21, 2019

(87) PCT Pub. No.: WO2018/132051
PCT Pub. Date: Jul. 19, 2018

(65) Prior Publication Data
US 2019/0281511 A1 Sep. 12, 2019

Related U.S. Application Data

(60) Provisional application No. 62/446,822, filed on Jan. 16, 2017.

(51) Int. Cl.
*H04W 36/36* (2009.01)
*H04W 36/00* (2009.01)

(52) U.S. Cl.
CPC ... *H04W 36/0061* (2013.01); *H04W 36/0016* (2013.01); *H04W 36/00837* (2018.08); *H04W 36/36* (2013.01)

(58) Field of Classification Search
CPC . H04W 36/08; H04W 36/36; H04W 36/0016; H04L 12/24
See application file for complete search history.

(56) References Cited

U.S. PATENT DOCUMENTS 5,751,708 A * 5/1998 Eng ................... H04L 12/2801
370/310.1
9,219,650 B2 * 12/2015 Sakata ................... H04L 41/00
(Continued)

FOREIGN PATENT DOCUMENTS

WO 2015113305 A1 8/2015

OTHER PUBLICATIONS

Ericsson et al., "Conditional Handover", 3GPP TSG-RAN WG2 NR Ad Hoc, Spokane, US, Jan. 17, 2017, pp. 1-4, Tdox R2-1700544, 3GPP.

(Continued)

*Primary Examiner* — Wei Zhao
(74) *Attorney, Agent, or Firm* — Coats & Bennett, PLLC

(57) ABSTRACT

A wireless communication device (16) is configured for use in a wireless communication system. The device (16) in this regard is configured to receive a command (22) that commands the device (16) to perform a link switch (24) from a source link (20A) to a target link (20B) responsive to fulfillment of a condition. The command (22) may indicate a target link configuration (26) relative to a source link configuration. The device (16) is also configured to store information (30) from which the target link configuration (26) indicated by the command (22) is determinable irrespective of any change to the source link configuration occurring after receipt of the command (22). In some embodiments, the device (16) is configured to, responsive to fulfillment of the condition, perform a link switch (24) from the source link (20A) to the target link (20B) using the target (Continued)

link configuration (26) as determined from the stored information (30).

24 Claims, 7 Drawing Sheets

(56) References Cited

U.S. PATENT DOCUMENTS

| | | |
|---|---|---|
| 2014/0126545 A1 | 5/2014 | Tamura et al. |
| 2016/0278129 A1 | 9/2016 | Lopez-Perez et al. |
| 2017/0230104 A1* | 8/2017 | Purkayastha ...... H04B 7/18541 |

OTHER PUBLICATIONS

Ericsson et al., "Conditional Handover", 3GPP TSG-RAN WG2 #97bis, Hangzhou, China, May 15, 2017, pp. 1-5, R21704087, 3GPP.

* cited by examiner

LINK SWITCH IN A WIRELESS COMMUNICATION SYSTEM

RELATED APPLICATIONS

This application claims priority to U.S. Provisional Patent Application Ser. No. 62/446,822, filed Jan. 16, 2017, the entire contents of which are incorporated herein by reference.

TECHNICAL FIELD

The present application relates generally to a wireless communication system, and relates specifically to link switch in a wireless communication system.

BACKGROUND

As channel conditions for a wireless communication device change, the device may switch (e.g., handover or reselect) from one wireless link to another in order to maintain service continuity. The device may for example switch from accessing the system via one access node, cell, sector, or beam (any of which may serve as a "link") to accessing the system via a different access node, cell, sector, or beam. Towards this end, when channel conditions on the link via which the device currently accesses the system deteriorates, the system may evaluate which of different candidate target links the device should switch to, if any. The device in this regard may perform measurements on the different candidate target links and report those measurements to another node in the network (e.g., the serving access node), so that the other node can make the link switch decision. Once the link switch decision is made, the node may command the device to switch to a chosen target link.

Known link switch approaches are susceptible to high latency that proves especially problematic when a link switch must be performed quickly, e.g., before the serving link's quality degrades excessively. However, reducing link switch latency while at the same time maintaining efficient signalling schemes proves challenging.

SUMMARY

According to one or more embodiments herein, a network node sends a command to a wireless communication device to switch from a source link to a target link responsive to fulfillment of a condition (e.g., as detected by the device). With the link switch conditionally commanded in this way, the command may be sent to the device earlier in time as compared to traditional approaches, so as to improve link switch robustness to degrading source link quality. Furthermore, some embodiments herein efficiently signal the target link configuration relative to the source link configuration, yet still ensure that the signalled target link configuration is recoverable or otherwise determinable even if the source link configuration changes (e.g., in the interim between when the link switch is conditionally commanded and when the link switch is performed).

More particularly, embodiments herein include a method performed by a wireless communication device configured for use in a wireless communication system. The method may comprise receiving a command that commands the wireless communication device to perform a link switch from a source link to a target link responsive to fulfillment of a condition. The command may indicate a target link configuration relative to a source link configuration. The method may also comprise storing information from which the target link configuration indicated by the command is determinable irrespective of any change to the source link configuration occurring after receipt of the command. In some embodiments, the method may further comprise performing one or more operations based on the stored information. In one example, for instance, performing one or more operations based on the stored information may comprise, responsive to fulfillment of the condition, performing a link switch from the source link to the target link using the target link configuration as determined from the stored information.

In some embodiments, the command includes relative reconfiguration information that indicates the target link configuration relative to the source link configuration. The relative reconfiguration information may for instance include one or more parameter values that are different between the target link configuration and the source link configuration, and exclude one or more parameter values that are the same between the target link configuration and the source link configuration. Regardless, the information from which the target link configuration indicated by the command is determinable may comprise the relative reconfiguration information and/or the source link configuration as of when the command is received.

In some embodiments, the method may further comprise, responsive to fulfillment of the condition, determining the target link configuration from the stored information. That is, determination of the target link configuration may be deferred until fulfillment of the condition for the link switch. In other embodiments, by contrast, the target link configuration indicated by the command may be determined responsive to receiving the command or responsive to determining that the source link configuration is to be changed. In these and other embodiments, then, the method may comprise storing the determined target link configuration as the stored information.

In any of these embodiments, the method may comprise, after storing the information from which the target link configuration indicated by the command is determinable, changing the source link configuration and preserving the stored information irrespective of the change to the source link configuration.

In some embodiments, the method may comprise associating the stored information with the condition, receiving an update to the condition, and updating the condition in accordance with the received update while preserving the stored information and the association of the condition with the stored information. Alternatively or additionally, the method may comprise associating the stored information with a validity timer for the command, receiving an update to the validity timer, and updating the validity timer in accordance with the received update while preserving the stored information and the association of the validity timer with the stored information.

In any of the embodiments, the target link configuration may specify a random access configuration for randomly accessing the target link.

In some embodiments, the condition is fulfilled when a signal measurement for the target link exceeds a signal measurement for the source link by at least a defined amount.

In some embodiments, the target link configuration is a radio resource control, RRC, configuration for the target link.

In some embodiments, the condition is a measurement configuration associated with a measurement event. For example, in some embodiments, the measurement configuration is provided explicitly in said conditional switch command. Alternatively or additionally, the measurement configuration is part of said source link configuration and wherein said conditional switch command comprises a reference to said measurement configuration.

Embodiments further include corresponding apparatus, computer programs, and computer readable medium.

Embodiments for instance include a wireless communication device configured for use in a wireless communication system. The wireless communication device in this regard is configured to receive a command that commands the wireless communication device to perform a link switch from a source link to a target link responsive to fulfillment of a condition. The command may indicate a target link configuration relative to a source link configuration. The wireless communication device is also configured to store information from which the target link configuration indicated by the command is determinable irrespective of any change to the source link configuration occurring after receipt of the command. In some embodiments, the wireless communication device is also configured to perform one or more operations based on the stored information. In one example, for instance, the wireless communication device is configured to, responsive to fulfillment of the condition, perform a link switch from the source link to the target link using the target link configuration as determined from the stored information.

Embodiments further include a method performed by a network node configured for use in a wireless communication system. The method comprises transmitting a command that commands a wireless communication device to perform a link switch from a source link to a target link responsive to fulfillment of a condition, wherein the command indicates a target link configuration relative to a source link configuration. The method may also comprise, after transmitting the command, changing the source link configuration. The method may further comprise, after changing the source link configuration, transmitting an updated command that indicates an updated target link configuration relative to the source link configuration before the source link configuration was changed.

In some embodiments, the method further comprises signaling that the updated command indicates the updated target link configuration relative to the source link configuration before the source link configuration was changed.

In some embodiments, the command includes relative reconfiguration information that indicates the target link configuration relative to the source link configuration as of when the command is transmitted.

In some embodiments, the relative reconfiguration information includes one or more parameter values that are different between the target link configuration and the source link configuration as of when the command is transmitted, and excludes one or more parameter values that are the same between the target link configuration and the source link configuration as of when the command is transmitted.

In some embodiments, the target link configuration specifies a random access configuration for randomly accessing the target link.

In some embodiments, the condition is fulfilled when a signal measurement for the target link exceeds a signal measurement for the source link by at least a defined amount.

In some embodiments, the target link configuration is a radio resource control, RRC, configuration for the target link.

Embodiments further include corresponding apparatus, computer programs, and computer readable medium.

For example, embodiments include a network node configured for use in a wireless communication system. The network node is configured to transmit a command that commands a wireless communication device to perform a link switch from a source link to a target link responsive to fulfillment of a condition, wherein the command indicates a target link configuration relative to a source link configuration. The network node is also configured to, after transmitting the command, change the source link configuration. The network node is further configured to, after changing the source link configuration, transmit an updated command that indicates an updated target link configuration relative to the source link configuration before the source link configuration was changed.

DETAILED DESCRIPTION

Figure 1:
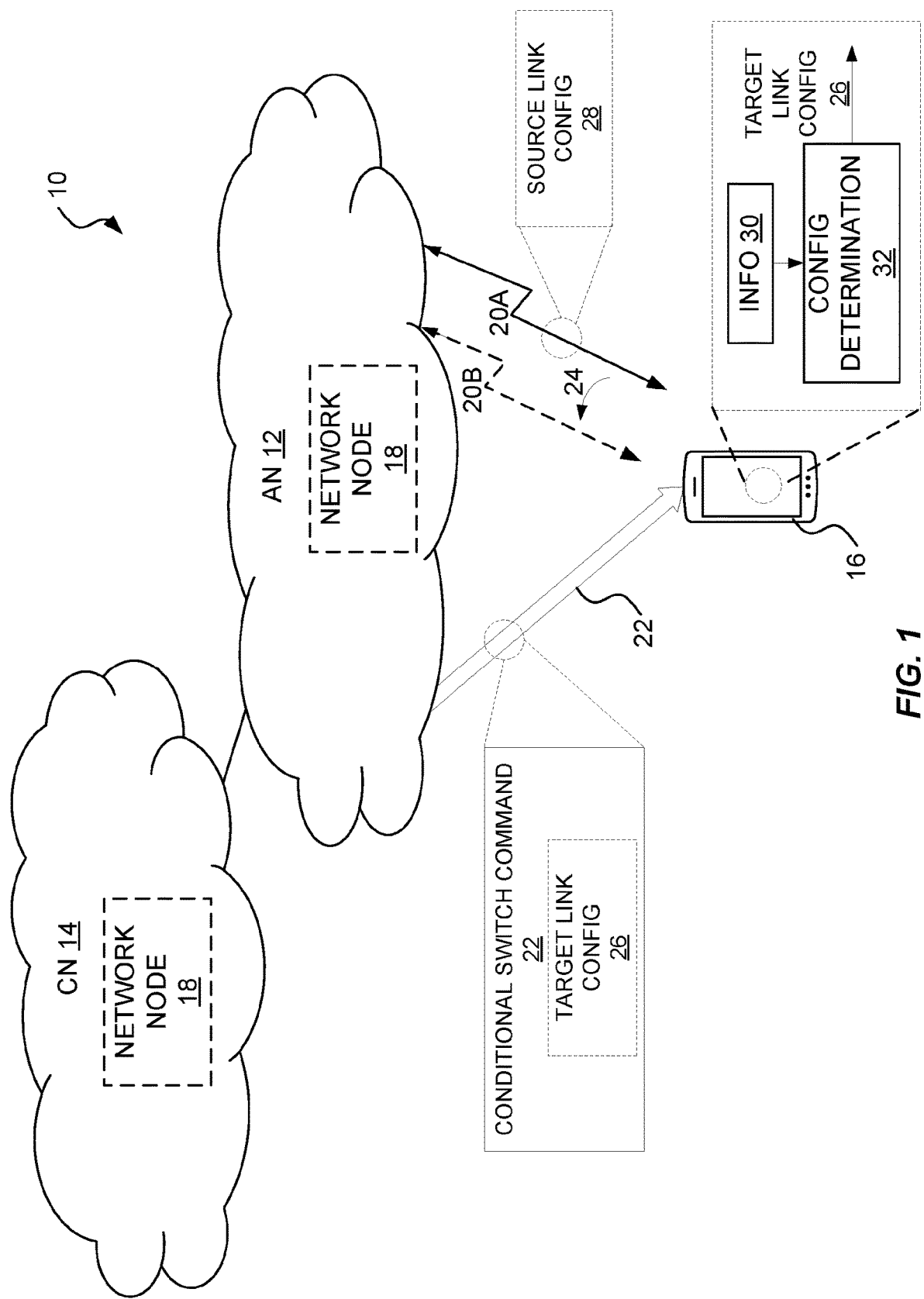
FIG. 1 is a block diagram of a wireless communication system that includes a wireless device and a network node according to some embodiments.

FIG. 1 illustrates a wireless communication system 10 according to one or more embodiments. As shown, the system 10 (e.g., a 5G system) may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network (e.g., the Internet).

The AN 12 provides links via which the wireless device 16 may wirelessly access the system 10, e.g., using uplink and/or downlink communications. The AN 12 may for example provide links in the form of access nodes (e.g., base stations), cells, sectors, beams, or the like. Some links may provide wireless coverage over different geographical areas.

A network node 18 controls which link the device 16 uses to access the system 10. The network node 18 may be in the AN 12 (e.g., in the form of a base station), or may be in the CN 14 (e.g., in the form of a mobility management entity, MME, or access and mobility function, AMF). The network node 18 may control which link the device 16 uses by for example deciding that the device 16 is to switch (e.g., handover or reselect) from accessing the system 10 via one link (the "source" link) to accessing the system 10 via another link (the "target" link). The network node 18 may choose the target link from among a set of multiple links that the network node 18 considers as candidates for the target link.

However, rather than unconditionally commanding the device 16 to switch from the source link to a chosen target link, the network node 18 in some embodiments conditionally commands the device 16 to perform such a link switch. FIG. 1 in this regard shows that the wireless communication device 16 may receive a conditional switch command 22, e.g., from or via the network node 18. Where the link switch is a handover, for instance, the command 22 may be a conditional handover command. Regardless, the conditional switch command 22 as shown "conditionally" commands the device 16 to perform a link switch 24 from a source link 20A to a target link 20B. The device 16 in particular is to perform that link switch 24 responsive to fulfillment of a condition (e.g., responsive to the device 16 detecting that the target link's signal strength or quality exceeds that of the source link by at least a defined amount). In some embodiments, for example, the device 16 may autonomously perform the link switch 24 as soon as the device 16 itself detects fulfillment of the condition. Conditionally performing the link switch 24 in this way may for instance improve the robustness of the link switch 24 against deteriorating source link conditions.

FIG. 1 also illustrates that in some embodiments the conditional switch command 22 indicates a target link configuration 26, e.g., to be used by the device 16 for the target link 20B to which the command 22 conditionally commands the device 16 to switch. The target link configuration 26 may be for instance a radio resource control (RRC) configuration to be used for the target link 20B, e.g., provided via an RRCConnectionReconfiguration message in LTE embodiments or via an RRCReconfiguration message in New Radio (NR) embodiments. The target link configuration 26 may for instance contain configuration parameters for data radio bearers, signalling radio bearers, medium access control (MAC), radio link control (RLC), packet data convergence protocol (PDCP), and/or physical layer used for the target link 20B. Configuration parameters may for example be for data and control channels, such as used for a random access channel. The target link configuration 26 in this regard may specify a random access configuration (e.g., in terms of a random access preamble or the like) that the device 16 is to use for connecting to the target link 20B. The random access configuration in this regard may include one or more sets of parameters that define when (in time), where (in frequency), and/or how (e.g., in terms of codes/preambles, power, periodicity) the device 16 may send random access requests for connecting to the target link 20B.

Regardless of the particular type of configuration 26, the conditional switch command 22 may indicate the target link configuration 26 relative to a source link configuration 28, e.g., the (e.g., RRC) configuration 28 used by the device 16 for the source link 20B from which the command 22 conditionally commands the device 16 to switch. The command 22 may for instance include (or otherwise be associated with) relative (or "delta") reconfiguration information that defines the target link configuration 26 relative to the source link configuration 28. The relative reconfiguration information in some embodiments, for example, includes one or more parameter values that are different between the target link configuration 26 and the source link configuration 28, and excludes one or more parameter values that are the same between the target link configuration 26 and the source link configuration 28. The command 22 in this regard effectively assumes that the device 16 already knows the parameter values of the target link configuration 26 which are the same as those of the source link configuration 28 as of when the command 22 is received, and therefore efficiently refrains from needlessly signaling those parameter values to the device 16. The device 16 in such case may be configured to form, derive, or otherwise determine the target link configuration 26 from the parameter values included in the command 22, in combination with any parameter values from the source link configuration 27 that are not included in the command 22.

Signalling the target link configuration 26 relative to the source link configuration 28 in this way may prove efficient in some embodiments. However, unless properly accounted for, changes in the source link configuration 28 may threaten to in turn change what target link configuration the device 16 detects as being signalled. The command 22 may for instance be built based on the source link configuration 28 as it (currently) exists at the time of command building, and changes to the source link configuration 28 that occur after command building may affect what target link configuration the device 16 interprets as being signalled by the command 22. This proves especially the case since the switch command 22 is conditional in nature. If, for example, the device 16 waits until the condition for the link switch occurs before naively determining the target link configuration 26 signalled, the device 16 may determine a different target link configuration than that actually signalled if the source link configuration 28 has changed in the interim.

To account for these and other problems surrounding configuration signalling, the device 16 in some embodiments herein stores information 30 from which the target link configuration 26 indicated by the conditional switch command 22 is determinable irrespective of any change to the source link configuration 28 occurring after receipt of the conditional switch command 22. That is, the information 30 stored enables the device 16 to determine the target link configuration 26 signalled, even if the source link configuration 28 changes after the device 16 receives the command 22. In some embodiments, for instance, the device 16 may memorialize or preserve the information 30 as stored (e.g., in memory), even if the source link configuration 28 is changed. With this information 30 preserved, the device 16 may be configured to determine 32 the signalled target link configuration 26 from the stored information 30, e.g., as opposed to with reference to whatever the current source link configuration 28 is, since that source link configuration 28 may have changed since the command 22 was built. Accordingly, no matter whether the source link configuration 28 is changed after receipt of the command 22, the device 16 may still determine the target link configuration 26 that was indicated by the command 22.

In some embodiments, for example, the information 30 stored includes the source link configuration 28 as of when the command 22 is received, or at least a portion thereof, e.g., as preserved or memorialized at the time the conditional switch command 22 is received. The device 16 may for instance store the source link configuration 28 in full or in part responsive to receiving the conditional switch command 22. Then, later (e.g., upon condition fulfillment), the device 16 may (retroactively) determine the target link configuration 26 that was indicated by the conditional switch command 22, by referencing the stored source link configuration 28, rather than the current source link configuration which may have since changed.

Alternatively or additionally, the information 30 stored may include the relative reconfiguration information mentioned above. The information 30 stored in such case may include the one or more parameters of the target link configuration 26 that are different from those of the source link configuration 28 as of when the command is received. When the relative reconfiguration information is stored in conjunction with the source link configuration 28, the stored information 30 thereby memorializes or preserves the target link configuration 26 as it was signalled by the command 22 in "relative" form.

In other embodiments, by contrast, the device 16 may memorialize or preserve the target link configuration 26 in "absolute" form, i.e., in a form that is not relative to the source link configuration 28. In some embodiments, for example, the device 16 determines the target link configuration 26 indicated by the conditional switch command 22 and stores that determined target link configuration 26 as the stored information 30. In some sense, then, the information 30 stored is an "absolute" target link configuration 26 that does not rely on any relativity to the source link configuration 28, as opposed to the "relative" target link configuration 26 signalled in the command 22 as being relative to the source link configuration 28.

In any event, the device 16 may determine the target link configuration 26 for storing in "absolute" form at any time after receiving the command 22 and before the source link configuration 28 is changed. In one embodiment, for example, the device 16 is configured to determine the target link configuration 26 indicated by the conditional switch command 22 responsive to (e.g., upon) receiving that command 22. This way, the source link configuration 28 will not have changed, guaranteeing that the determined target link configuration 26 represents the configuration intended to be signalled. In other embodiments, by contrast, the device 16 may wait to determine the target link configuration 26 until the source link configuration 28 is about to be changed. The device 16 may for instance determine the target link configuration 26 indicated by the conditional switch command 22 responsive to receiving a reconfiguration message indicating that the source link configuration 28 is to be changed. In either approach, though, the device 16 stores the determined target link configuration 26, so as to memorialize that configuration 26 for a potential link switch 24 upon fulfillment of the associated condition.

Memorialization of the signaled target link configuration 26 using the stored information may mean that the device 16 preserves that stored information 30 even if the source link configuration 28 changes. That is, the device 16 in some embodiments may change the source link configuration 28 (e.g., as directed by the network node 18) after storing the information 30, but may preserve that stored information 30 irrespective of such change to the source link configuration 28.

Similarly, the device 16 may preserve the stored information 30 even if the network node 18 signals an update to command 22, e.g., to change the condition for performing the link switch 24 and/or to change a validity timer for the command 22. In some embodiments, for instance, the device 16 may associate the stored information 30 with the condition for performing the link switch 24. In this case, when the device 16 receives an update to the condition, the device 16 may update the condition in accordance with the received update while preserving the stored information 30 and the association of that stored information 30 with the (now updated) condition. Alternatively or additionally, the device 16 may associate the stored information 30 with a validity timer for the command 22, e.g., that indicates a duration for how long the command 22 remains valid. In this case, when the device 16 receives an update to the validity timer (e.g., extending the time for which the command 22 is valid), the device 16 may update the validity timer in accordance with the received update while preserving the stored information 30 and the association of that stored information 30 with the (now updated) validity timer. Under some conditions, though, such as when the stored information is no longer needed, the stored information 30 may be discarded or replaced. For example, under some circumstances, the link switch 24 to the target link 20B may be canceled prior to the fulfillment of the condition. In some embodiments, for instance, the device 16 may cancel the link switch 24 responsive to receiving a command to specifically cancel the link switch 24, or to generally cancel any link switch for which a respective condition has not been fulfilled. In other embodiments, the device 16 may cancel the link switch 24 responsive to receiving a command to perform a link switch from the source link 20A to a different target link, or responsive to successfully performing (or signaling confirmation of) a link switch from the source link 20A to a different target link. Regardless, responsive to canceling the link switch 24, the device 16 may discard the stored information 30, e.g., as no longer being needed since the target link configuration 26 no longer needs to be determined. In some embodiments, however, the device 16 may only discard the stored information 30 if the device 16 indeed determines that the stored information 30 is not needed, e.g., as opposed to assuming that such is the case simply upon cancelling the link switch 24.

Indeed, in these and other embodiments, the device 16 may receive one or more conditional switch commands 22 that command the device 16 to perform a link switch from the source link 20A to different target links responsive to fulfillment of respective conditions. For the respective target links, the one or more commands may indicate respective target link configurations, which may be the same or different across the target links. The device 16 may thereby store information from which the respective target link configurations are each determinable. For example, where the respective target link configurations are indicated relative to the same source link configuration 28, the device 16 in some embodiments may store the source link configuration 28 from which the respective target link configurations may be determinable (e.g., in conjunction with relative reconfiguration information associated respectively with the individual target links). Accordingly, with multiple target link configurations determinable from the same stored source link configuration 28, the device 16 may only discard that stored information upon determining that no target link configuration is determinable from the stored source link configuration 28. For example, if a link switch to one of the target links is canceled, but at least one other link switch to another of the target links remains pending, the device 16 may continue to preserve the stored information, at least to the extent needed to determine the target link configuration for the pending link switch.

Figure 2:
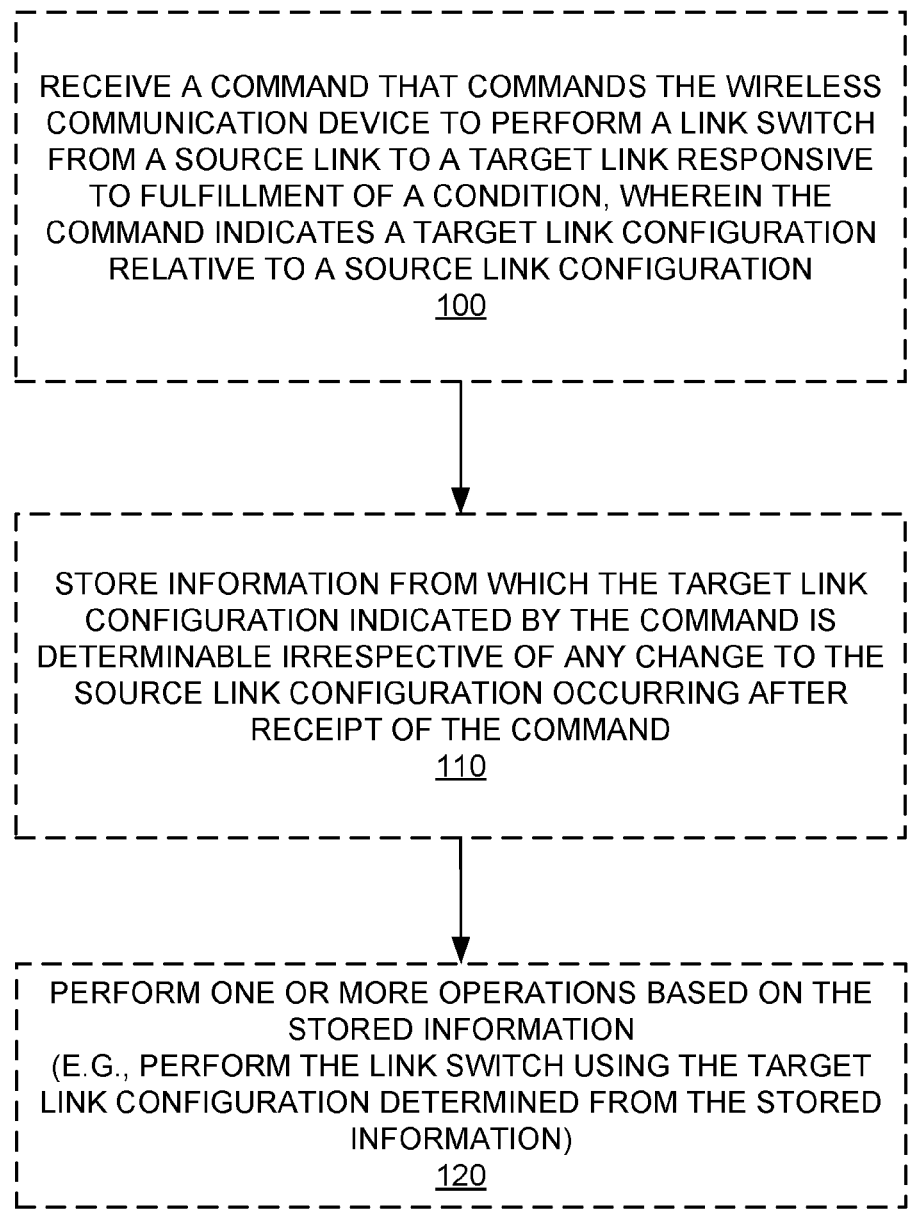
FIG. 2 is a logic flow diagram of a method performed by a wireless device according to some embodiments.

Under some conditions, the device 16 in other embodiments may simply update the stored information rather than discarding it. For example, the device 16 may receive an updated command for the target link that indicates an updated target link configuration relative to the same source link configuration. In this case, the device 16 may replace the stored information 30 with information from which the updated target link configuration is determinable irrespective of any changes to the source link configuration occurring after receipt of the updated command. In view of the above modifications and variations, FIG. 2 generally illustrates processing performed by the wireless communication device 16 according to some embodiments. As shown, the processing may include receiving a command 22 that commands the wireless communication device 16 to perform a link switch 24 from a source link 20A to a target link 20B responsive to fulfillment of a condition (Block 100). The command 22 may indicate a target link configuration 26 relative to a source link configuration 28. Processing as shown in FIG. 2 may also include storing information 30 from which the target link configuration 26 indicated by the command 22 is determinable irrespective of any change to the source link configuration 28 occurring after receipt of the command 22 (Block 110).

In some embodiments, processing may also include performing one or more operations based on the stored information 30 (Block 120). In one embodiment, for example, performing one or more operations based on the stored information 30 may comprise, responsive to fulfillment of the condition, performing a link switch 24 from the source link 20A to the target link 20B using the target link configuration 26 as determined from the stored information 30.

In other embodiments, these one or more operations may relate to managing the stored information 30. For example, the device 16 may be configured to discard or delete the stored information 30 if it is no longer applicable to a pending link switch, e.g., if the conditional link switch is canceled prior to the associated condition being fulfilled. In some embodiments, for instance, the one or more operations comprise canceling the link switch to the target link prior to fulfillment of the condition, and discarding the stored information responsive to such canceling. Cancellation of a conditional link switch may occur for instance responsive to receipt of a cancel switch command, receiving a switch command that commands a switch to a different target link, and/or successfully performing, or signaling confirmation of, a switch to a different link.

One or more additional embodiments will now be described in a context where the system 10 is a 5G or New Radio (NR) system, a link is a cell, the link switch 24 is a handover, and the link configuration is an RRC configuration.

In more detail, one of the main goals of New Radio (NR) is to provide more capacity for operators to serve ever increasing traffic demands and a variety of applications. Because of this, NR will be able to operate on high frequencies like frequencies over 6 GHz up to 60 or even 100 GHz. In comparison to the current frequency bands allocated to Long Term Evolution (LTE), some of the new bands will have much more challenging propagation properties such as lower diffraction and higher outdoor/indoor penetration losses. As a consequence, signals will have less ability to propagate around corners and penetrate walls. In addition, in high frequency bands, atmospheric/rain attenuation and higher body losses render the coverage of NR signals even more spotty.

Fortunately, the operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties.

Despite the link budget gains provided by beamforming solutions, reliability of a system purely relying on beamforming and operating in higher frequencies might be challenging, since the coverage might be more sensitive to both time and space variations. As a consequence of that, the signal-to-interference-plus-noise ratio (SINR) of such a narrow link can drop much quicker than in the case of LTE. The serving cell may therefore not be able to convey a handover command timely. Lowering the Time-To-Trigger (TTT) parameter and the measurement hysteresis reduces the handover failure rate, but also results in higher ping-pong probability. Accordingly, quickly degrading link quality prohibits delivery of the handover (HO) command from the source cell to the user equipment (UE), which leads ultimately to a handover failure. In NR, these effects will be even more pronounced when operating at higher frequency bands. To ensure that NR offers at least as robust mobility (as low or lower Handover-Failure (HOF) rates) as LTE, there is a need to put attention to mobility robustness in NR systems.

In LTE and NR, different solutions to increase mobility robustness have been discussed. One area of solutions is based on Dual Connectivity introduced in LTE Rel-12. In Dual Connectivity, the UE is connected to two network nodes at the same time. This allows improving mobility robustness by serving control plane traffic (e.g. used for measurement reporting and handover command) by the more robust macro layer on low frequency and providing a capacity boost by higher layers. This feature is called user Plane (UP)/Control Plane (CP) split. One variant of Dual Connectivity is RRC diversity feature, which allows sending control plane signaling over two nodes. This increases diversity in temporal and spatial domain and thus increases robustness.

One issue of Dual Connectivity solutions is that the UE must be served with two connections. This can become problematic as network resources are consumed more. In addition, Dual Connectivity requires two different receive/transmit (RX/TX) chains in the UE side which comes with the device manufacturing cost. Because of that, also alternative solutions should be considered.

In order to avoid the undesired dependence on the serving radio link upon the time (and radio conditions) where the UE should execute the handover, NR according to some embodiments may provide RRC signaling for the handover to the UE earlier than conventional. To achieve this, the handover command may be associated with a condition. As soon as the condition is fulfilled, the UE may execute the handover in accordance with the provided handover command.

Such a condition may e.g. be based on the comparison of measurement results that the UE acquires, also known as "measurement event". An event or condition is typically expressed as an equation and considered to be fulfilled if the equation is "true". An example for a measurement event is an equation that compares a measurement quantity (typically "signal strength" or "signal quality") determined for a neighbor cell (e.g. "rsrpNeighbour") with the measurement quantity determined for the serving cell (e.g. "rsrpServing"). Besides these two measurement values, there may be an additional threshold or hysteresis (e.g. thresholdX). The event is then considered fulfilled, if "rsrpNeighbour>rsrpServing+thresholdX". Hence, the UE would in this example execute the handover when the signal strength (RSRP) of the neighbor cell becomes more than X (dB) better than the signal strength of the serving cell.

The handover procedure (negotiation between source cell and candidate target cell and provisioning of a handover command via the source cell to the UE) may be triggered by a measurement report. The serving cell configures the UE with measurement events (conditions) that are associated with measurement configurations. If such a measurement event is fulfilled, the UE generates a measurement report comprising measurement quantities (e.g. signal strength) for one or more detected cells (serving and/or neighbor cells). The UE then sends the measurement report to its serving cell so that the serving cell can decide whether or not to initiate said handover procedure towards any of the reported neighbor cells. The measurement event triggering the measurement report may use the same condition (e.g., formula) as mentioned above. However, a thresholdY in the condition for the measurement report triggering may be chosen lower than the thresholdX in the handover execution condition. This allows the serving cell to prepare the handover upon reception of an early measurement report and to provide an RRCConnectionReconfiguration with mobifityControlInfo at a time when the radio link between the source cell and the UE is still stable (neighbor is only Y dB better than serving, where Y may e.g. be set to 0). The execution of the handover is done at a later point in time (when the neighbor is already X dB better than serving, where X may e.g. be 3 dB) when the radio conditions are considered optimal for the handover execution.

Figure 3:
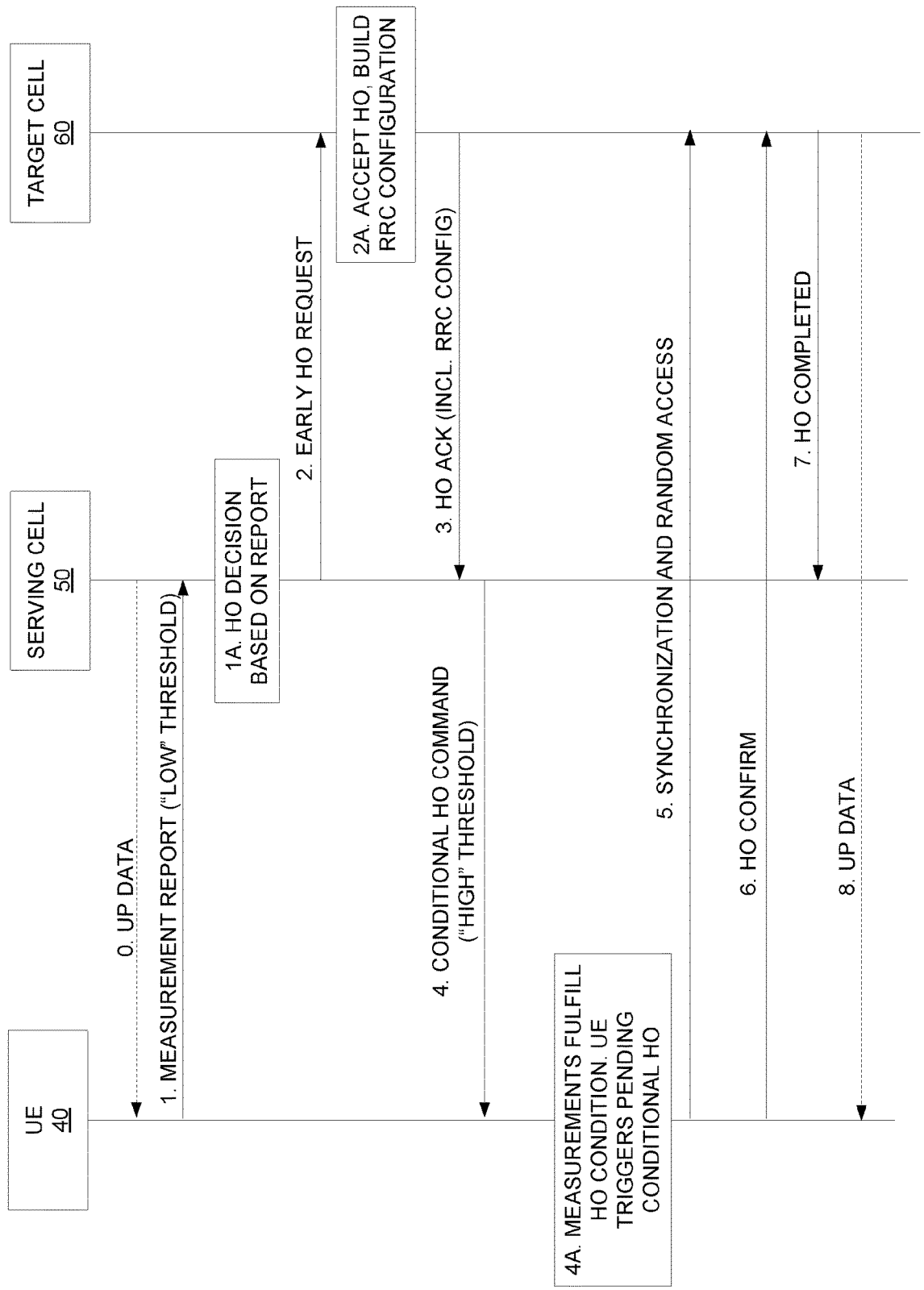
FIG. 3 is a call signaling diagram of a procedure for a conditional link switch according to some embodiments.

FIG. 3 depicts an example with a serving cell and just one target cell. As shown, a UE 40 receives user plane (UP) data from a serving cell 50 (step 0). Upon fulfillment of a measurement event (e.g., based on a 'low' threshold such as a thresholdY), the UE 40 sends a measurement report to the serving cell 50 (Step 1). The measurement report may include a measurement quantity for a target cell 60. Based on the report, the serving cell 50 in this example makes a decision to prepare the target cell 60 for a potential handover (Step 1A). Based on this decision, then, the serving cell 50 sends a handover request to the target cell 60 (Step 2), which may happen earlier than in a conventional handover procedure given the low threshold for the measurement report. Where the handover request is sent early in this way, it may be referred to as an "early HO request" as shown in FIG. 3. The target cell 60 accepts the handover in response to the request, and builds an RRC configuration for the UE 40 to use with the target cell 60 (Step 2A). The target cell 60 then sends a handover acknowledgement to the serving cell 50 including the built RRC configuration (Step 3). The serving cell 50 correspondingly sends a conditional handover command to the UE 40 that commands the UE 40 to handover to the target cell 60 responsive to fulfillment of a condition (Step 4). This condition may be based on a 'high' threshold (E.g., thresholdX) that is higher than the low threshold which triggered the measurement report. When measurement of the target cell 60 fulfills the handover condition (e.g., based on the high threshold), the UE 40 autonomously triggers the pending conditional handover to the target cell 60 (Step 4A). The UE 40 in this regard performs synchronization and random access with the target cell 60 (Step 5) and confirms handover to the target cell 60 (Step 6). After signaling the completion of the handover to the serving cell 50 (Step 7), the target cell 60 may provide user plane data to the UE (Step 8).

In practice, though, there may often be many cells or beams that the UE reports as possible candidates based on its preceding radio resource management (RRM) measurements. The network may then have the freedom to issue conditional handover commands for several of those candidates. The RRCConnectionReconfiguration for each of those candidates may differ e.g. in terms of the HO execution condition (reference signal to measure and threshold to exceed) as well as in terms of the random access preamble to be sent when a condition is met.

The RRCConnectionReconfiguration may be a "delta" to the UE's current configuration, i.e., the RRCConnectionReconfiguration message does not comprise all parameters that determine the UE configuration but only the ones that have changed compared to the UEs current configuration. In some embodiments, the UE shall apply RRCConnectionReconfiguration messages in the order in which it receives them, which is, due to the properties of the Radio Link Control (RLC) protocol, as well as the order in which the network generated and sent them.

The UE may be able to determine unambiguously how to apply the (delta) configuration provided in the conditional handover command so that the configuration used thereafter by the UE is in-line with what the network expects. In some embodiments, therefore, the triggering condition associated with the HO command sent to the UE should evaluate measurements and trigger the handover when those conditions are fulfilled. But since the HO command configuration may be a delta to the UE's current RRC configuration, one or more embodiments address how to handle subsequent RRCConnectionReconfiguration messages arriving from the source cell if the UE has not yet executed the handover.

When the UE receives a "conditional HO command" it may interpret the RRCConnectionReconfiguration with mobilityControlInfo as a delta to its current configuration (unless it is a full configuration message). It may in principle determine the resulting target configuration immediately upon reception of the command but it shall apply/execute it only if/when the associated condition is fulfilled. While the UE evaluates the condition it may continue operating per its current serving cell RRC configuration, i.e., without applying the conditional HO command.

When the UE determines that the condition is fulfilled, it disconnects from the serving cell, applies the conditional HO command and connects to the target cell. Once the UE applies the RRCConnectionReconfiguration including mobifityControlInfo, it shall not process any subsequent RRCConnectionReconfiguration messages received prior to the HO execution.

However, before the HO condition is fulfilled, the UE may stay in the source cell. During this period, the source cell should have means to perform further reconfigurations of the UE either to change the UE operation in the current serving cell or to issue a (conditional or immediate) handover to another target cell. In this scenario, the previously received conditional HO command cannot heretofore be applied as a delta to the updated serving cell configuration (after applying the RRCConnectionReconfiguration) as the original conditional HO command was built as a delta to the previous RRC configuration, i.e., prior to the reception of the serving cell reconfiguration command.

The simplest solution would be that the UE discards the pending conditional HO command when receiving a subsequent RRCConnectionReconfiguration from its source cell. But this implies that the source eNB must re-issue the conditional HO command towards the UE; now as a delta to the updated source cell configuration. However, as RRC configuration in the conditional HO command is built by the target eNB, this would imply additional inter-eNB signaling and subsequent Uu signaling.

One or more embodiments provide an efficient way to handle subsequent RRC reconfigurations as well as configurations towards multiple cells when using conditional HO solution.

Instead of simply discarding all pending (unfulfilled) conditional HO commands upon reception of a subsequent RRCConnectionReconfiguration for the current serving cell, the UE in some embodiments applies the subsequent RRCConnectionReconfiguration for the serving cell as a delta to the current configuration of the serving cell; and it preserves the previously received pending conditional HO commands for the one or more target cells, i.e., the target cell configurations associated with the target cells are unaffected by the subsequent RRCConnectionReconfiguration for the serving cell.

Subsequent RRCConnectionReconfiguration

To avoid additional signalling between eNBs and towards the UE, the UE may not discard the conditional HO command when receiving the subsequent RRCConnectionReconfiguration for the serving cell.

In accordance with a first example embodiment, upon reception of a subsequent RRCConnectionReconfiguration for the current serving cell, the UE applies the subsequent RRCConnectionReconfiguration for the serving cell as a delta to the current configuration of the serving cell; and it preserves the previously received pending conditional HO commands for the one or more target cells, i.e., the target cell configurations associated with the one or more target cells are unaffected by the subsequent RRCConnectionReconfiguration for the serving cell.

In an example embodiment in accordance with the first example embodiment, when the UE receives either a conditional HO command or when the UE receives the subsequent RRCConnectionReconfiguration, the UE determines the target cell configuration from the current RRC configuration of the serving cell (before applying new received RRCConnectionReconfiguration) and from the delta configuration received in the conditional HO command; and the UE stores and preserves the determined target cell configuration.

An RRCConnectionReconfiguration for the source cell received after the conditional HO command for a target cell impacts therefore only the operation towards the source cell but not the configuration towards the target cell.

In another example embodiment in accordance with the first example embodiment, the UE stores a received conditional HO command as well as the current RRC context of the serving cell (assuming that the RRCConnectionReconfiguration is provided as a delta to the current serving cell configuration). If the UE receives a subsequent RRCConnectionReconfiguration for the source cell, it applies that reconfiguration but leaves the stored the current RRC context of the serving cell unaffected. When the trigger condition is fulfilled, the UE determines the target cell configuration from the stored serving cell configuration and delta received in the "conditional HO command" and then uses that when HO is executed.

Updating a Conditional HO Command for a Target Cell

In another example embodiment, the network may decide to provide a new, updated RRCConnectionReconfiguration in a conditional HO command for a target cell for which it had previously provided a conditional HO command. Correspondingly, if the UE receives a conditional HO command for a target cell for which it has already a pending conditional HO command, it determines the target cell configuration based on its current serving cell configuration and the "delta" in the HO command and uses it to towards the target cell.

In another example embodiment, the network may indicate to the UE in the updated conditional HO command, whether the contained configuration is a delta to the current serving cell configuration or to the previously determined and preserved configuration of the target cell. Correspondingly, the UE either determines the new target cell configuration by applying the reconfiguration in the received updated conditional HO command as a delta to its current serving cell configuration or as a delta to the previously determined configuration for the target cell.

In another example embodiment, the network may only provide to the UE an updated condition in a HO command for a cell for a target cell for which it had previously provided a conditional HO command. If the UE receives such a conditional HO command with a new condition but without a (new) RRCConnectionReconfiguration for a target cell for which it has already a pending conditional HO command, it preserves the previously received RRCConnectionReconfiguration but associates it with the received updated condition.

In an example embodiment according to any of the preceding example embodiments, the network may provide an updated configuration of a pending conditional HO command. This may entail updating one of the set of allowed target cell beams or the random access configuration for accessing the target cell.

Extending the Validity of a Conditional HO Command

The serving eNB operates the serving cell, which may be known as a source cell for a handover. The target eNB operates a neighbor cell towards which the UE is supposed to perform the handover. In this case, then, the neighbor cell may also be known as the target cell of the handover. The serving eNB may ask the target eNB to prolong the conditional HO command validity and if granted by the target eNB, send a new time limit to the UE for the conditional HO command that extends the validity time, i.e., extends the time period during which the UE should evaluate the conditional HO command and during which it may trigger the HO if the condition is fulfilled.

If the UE receives such a conditional HO command with a new validity time but without a (new) RRCConnectionReconfiguration for a target cell for which it has already a pending conditional HO command, it may preserve the previously received RRCConnectionReconfiguration but associate it with the received updated validity time.

Discarding Conditional HO Command

The source cell may at any time discard any outstanding conditional HO in the UE. If the UE receives such a command indicating that a previously received conditional HO command for a target cell is no longer valid, the UE may discard the previously received RRCConnectionReconfiguration and the associated condition. A UE may in some embodiments signal to the network that such cancellation is successful, implying that the stored related RRC state information has been removed.

Replacing a Conditional HO Command for a First Target Cell by a Conditional HO Command for a Second Target Cell In another example embodiment, the eNB decides based on the RRM measurements that the potential target cell must be changed. In this scenario, the source eNB provides the conditional HO command to the UE with a new target cell and indicates that the UE shall discard the earlier provided conditional HO command. Correspondingly, the UE shall be prepared to receive simultaneously the cancellation of a previously received pending HO command to a first target cell and a new/updated conditional HO command for a second target cell. Such discard command would indicate to the UE to cancel a previously given HO command and remove all the stored related RRC state information. The command may target all the previously given conditional HOs, a given conditional HO or a specific target cell or a number of cells from a list of multiple cell sharing the same configuration given by the RRCConnectionReconfiguration. In this last case, the UE should keep the stored related RRC state information unless all the conditional HO command for cells sharing the same configuration are cancelled. A UE may in some embodiments signal to the network that the new conditional HO command has been received and the cancellation of the indicated conditional HO has been successful.

Figure 4:
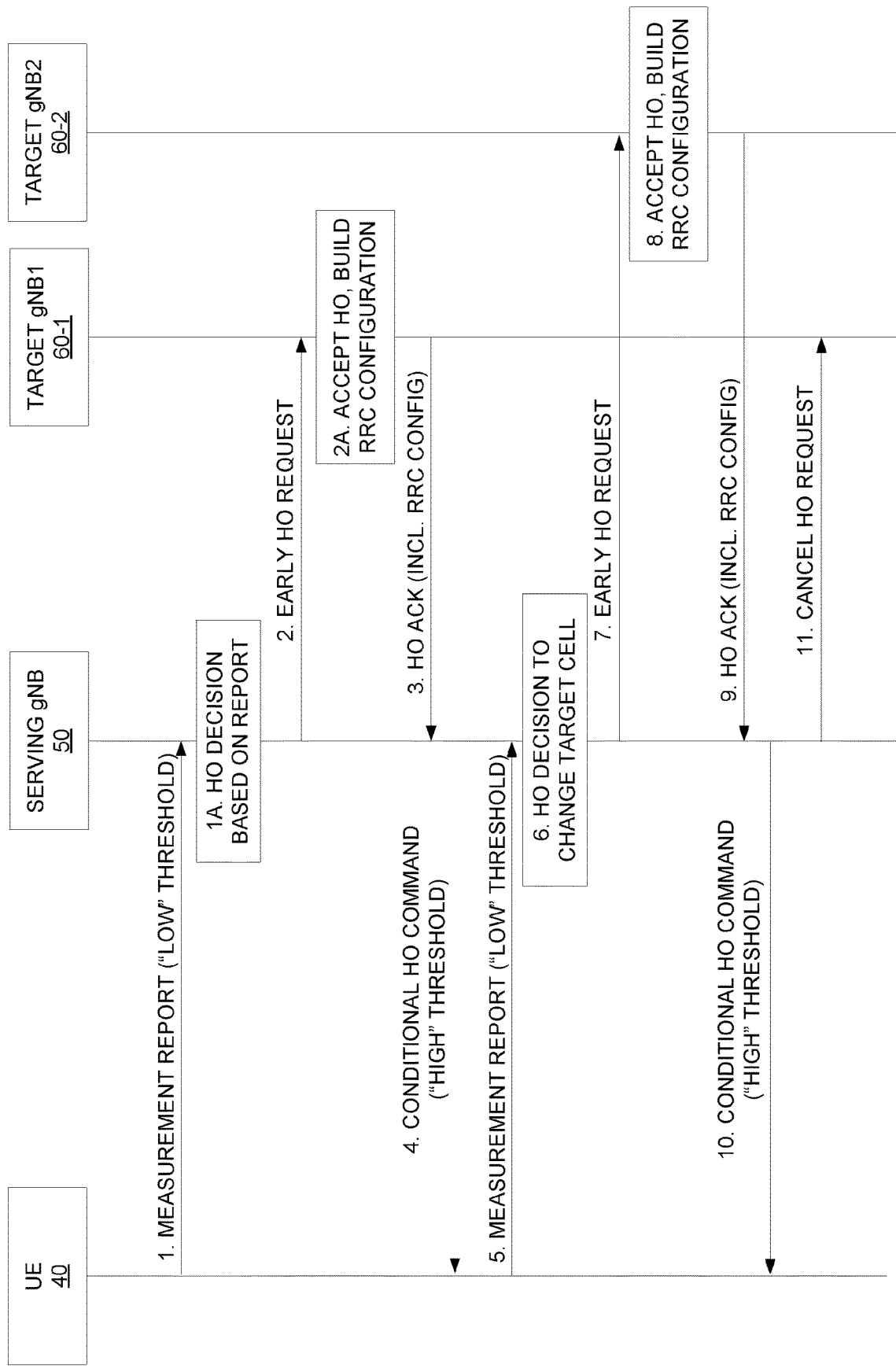
FIG. 4 is a call signaling diagram of a procedure for a conditional link switch according to other embodiments.

In FIG. 4, inter-eNB signaling is presented for this scenario. As shown, upon fulfillment of a measurement event (e.g., based on a low' threshold such as a thresholdY), the UE 40 sends a measurement report to the serving gNB 50 (Step 1). The measurement report may include a measurement quantity for a first target gNB 60-1. Based on the report, the serving gNB 50 in this example makes a decision to prepare the first target gNB 60-1 for a potential handover (Step 1A). Based on this decision, then, the serving gNB 50 sends a handover request to the first target gNB 60-1 (Step 2), which may happen earlier than in a conventional handover procedure given the low threshold for the measurement report. Where the handover request is sent early in this way, it may be referred to as an "early HO request" as shown in FIG. 4. The first target gNB 60-1 accepts the handover in response to the request, and builds an RRC configuration for the UE 40 to use with the first target gNB 60-1 (Step 2A). The first target gNB 60-1 then sends a handover acknowledgement to the serving gNB 50 including the built RRC configuration (Step 3). The serving gNB 50 correspondingly sends a conditional handover command to the UE 40 that commands the UE 40 to handover to the first target gNB 60-1 responsive to fulfillment of a condition (Step 4). This condition may be based on a 'high' threshold (E.g., thresholdX) that is higher than the low threshold which triggered the measurement report.

Before measurement of the first target gNB 60-1 fulfills the handover condition (e.g., based on the high threshold), though, the UE 40 sends another measurement report to the serving gNB 50 (Step 5), including a measurement quantity for a second target gNB 60-2. Based on the report, the serving gNB 50 in this example makes a decision to prepare the second target gNB 60-2 for a potential handover (Step 6). Based on this decision, then, the serving gNB 50 sends an early handover request to the second target gNB 60-2 (Step 7). The second target gNB 60-2 accepts the handover in response to the request, and builds an RRC configuration for the UE 40 to use with the second target gNB 60-2 (Step 8). The second target gNB 60-2 then sends a handover acknowledgement to the serving gNB 50 including the built RRC configuration (Step 9). The serving gNB 50 correspondingly sends a conditional handover command to the UE 40 that commands the UE 40 to handover to the second target gNB 60-2 responsive to fulfillment of a condition (Step 10). In this example, this latter conditional handover command operates to cancel the pending conditional handover to the first target gNB 60-1. The serving gNB 50 in some embodiments may then indicate to the first target gNB 60-1 that the handover request is cancelled (step 11), e.g., so that the first target gNB 60-1 may release any resources it had reserved for the potential handover.

Accordingly, this example demonstrates that based on RRM measurements, the serving eNB triggers HO negotiation towards gNB1. The serving cell sends the Conditional HO command to the UE in step 4. Later on, based on new measurements, the serving gNB decides to trigger HO negotiation towards target gNB2. The conditional HO command towards gNB2 as well as the cancellation of the conditional HO command towards gNB1 is sent in Step 10 towards the UE. After that the serving eNB informs gNB1 that earlier HO request is cancelled.

In one embodiment, the UE replies with a handover complete message towards the source eNB as a response to the conditional HO command RRC message. This confirms that the UE has successfully received the conditional HO command.

Multiple Cells Prepared

As explained above, it may be desirable to provide the UE with HO conditions and configurations for several candidate target cells. When receiving conditional HO commands for multiple target cells, the UE evaluates HO conditions for more than one candidate target cell and stores configurations for those individually as described in the previous subsection. However, this solution may lead to additional complexity in the UE side especially because the UE may need to store several configurations that have exactly the same resulting configuration in the target cell.

Therefore, in another example embodiment, the network informs in the conditional HO command that the RRCConnectionReconfiguration in the conditional HO command is applicable for several cells. That is to say, the same conditional HO command applies to multiple cells. When the UE receives this kind of conditional HO command, it stores only one configuration associated with multiple target cells.

In another example embodiment, the network provides a conditional HO command with multiple cells and potentially multiple configurations. When receiving such configuration, the UE stores the current serving cell RRC configuration (RRC context). When the HO is triggered, the UE derives the corresponding target cell configuration based on the source cell configuration stored upon reception of the HO command and the parameters provided in the conditional HO command.

Discarding Pending Conditional HO Commands Upon Handover

When the UE executes a handover to a target cell, that target cell sends a path switch request to the core network (CN) upon which the CN forwards the newly arriving data to the target cell. Furthermore, the CN confirms the path switch request towards the target and the target informs the source cell that it may release the UE context. In addition to that procedure the following is proposed.

In another example embodiment, the source cell should inform other target cells (if any) with which it had prepared a HO for the UE, that they may release their preparation for the inbound HO of the UE.

Similarly, the UE might have been configured with several conditional HO commands. When the condition of one of these HO is fulfilled, the UE performs the handover towards the target cell in accordance with the associated RRCConnectionReconfiguration. According to one embodiment, the UE discards all other pending HO command (if any) upon executing mobility towards a target cell. This may be triggered due to fulfillment of a conditional handover but also due a non-conditional handover. And it may be a handover to a different cell or to the current serving cell (intra-cell HO).

While the early handover preparation is intended to increase the success of the HO execution, there may still be occasions where the UE triggers the HO to a target cell but where the HO fails. In such cases, one may consider it premature that the UE discarded the conditional HO commands towards other candidate target cells and the configuration for the previous source cell. Hence, the following enhancement is proposed.

In another example embodiment, when executing a HO command the UE preserves other pending conditional HO commands (if any) until having sent the RRCConnection- ReconfigurationComplete message to that target cell (HO succeeded). If it does not receive the grant enabling it to send the RRCConnectionReconfigurationComplete, it may continue to evaluate the conditions of the other pending conditional HO commands and execute one of those when their condition is being fulfilled.

Generally, then, embodiments herein include a method in a terminal operating in a wireless network. The method may be characterized by receiving a conditional HO command, storing the current RRC configuration and the conditional HO command, selecting a target cell based on a condition, deriving a target cell configuration from the stored RRC configuration and conditional HO command associated with the selected target cell, and sending Random Access and RRCConnectionReconfigurationComplete towards the target cell.

As discussed above, some embodiments allow efficient reconfigurations of the source cell configuration while the UE maintains and evaluates the pending conditional HO commands and the target cell configurations associated with those.

Note that embodiments herein are applicable to any type of wireless communication system (e.g., Long Term Evolution, Wideband CDMA, GSM, Wifi or the like) for switching between links of any kind (e.g., cells, sectors, nodes, beams).

A network node herein is any type of node in the wireless communication system 10, e.g., in the access network 12 or core network 14. A radio node herein is any type of node (e.g., a base station or wireless communication device) capable of communicating with another node over radio signals. A radio network node is any type of radio node within the access network 12, such as a base station. A wireless communication device or simply wireless device is any type of radio node capable of communicating with a radio network node or another wireless communication device over radio signals. A wireless communication device may therefore refer to a machine-to-machine (M2M) device, a machine-type communications (MTC) device, a narrowband internet of things (NB-IoT) device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a wireless device 16 as described above may perform the method in FIG. 2 and any other processing herein by implementing any functional means or units. In one embodiment, for example, the wireless device 16 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5B:
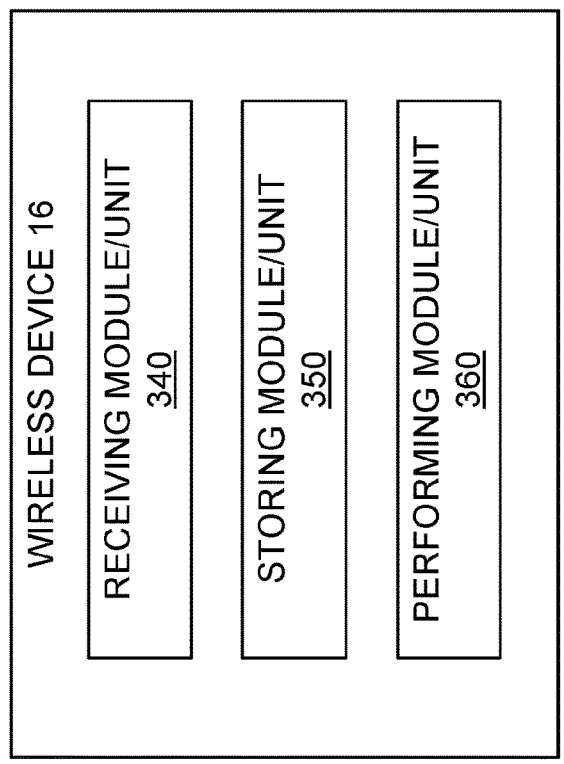
FIG. 5B is a block diagram of a wireless device according to other embodiments.
Figure 5A:
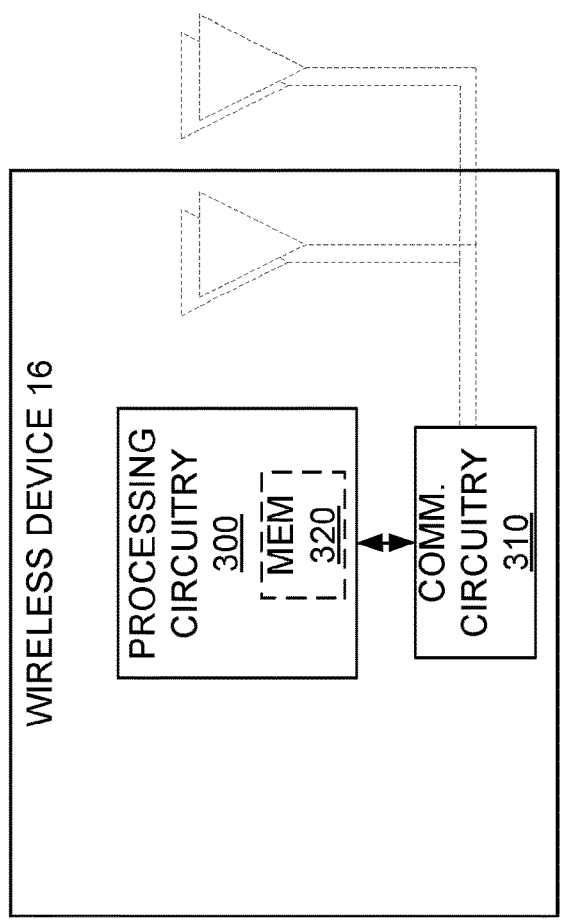
FIG. 5A is a block diagram of a wireless device according to some embodiments.

FIG. 5A for example illustrates the wireless device 16 in accordance with one or more embodiments. As shown, the wireless device 16 includes processing circuitry 300 and communication circuitry (comm. circuitry) 310. The communication circuitry 310 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the wireless device 16 as shown. The processing circuitry 300 is configured to perform processing described above, e.g., in FIG. 2, such as by executing instructions stored in memory (MEM) 320. The processing circuitry 300 in this regard may implement certain functional means, units, or modules.

FIG. 5B illustrates the wireless device 16 in accordance with one or more other embodiments. As shown, wireless device 16 implements various functional means, units, or modules, e.g., via the processing circuitry 300 in FIG. 5A and/or via software code, for implementing the functionality described above (e.g., for implementing the steps in FIG. 2). These functional means, units, or modules include for instance a receiving module or unit 340 for receiving the conditional switch command 22, a storing module or unit 350 for storing the information 30, and a performing module or unit 360 for performing one or more operations based on the stored information 30.

Figure 6:
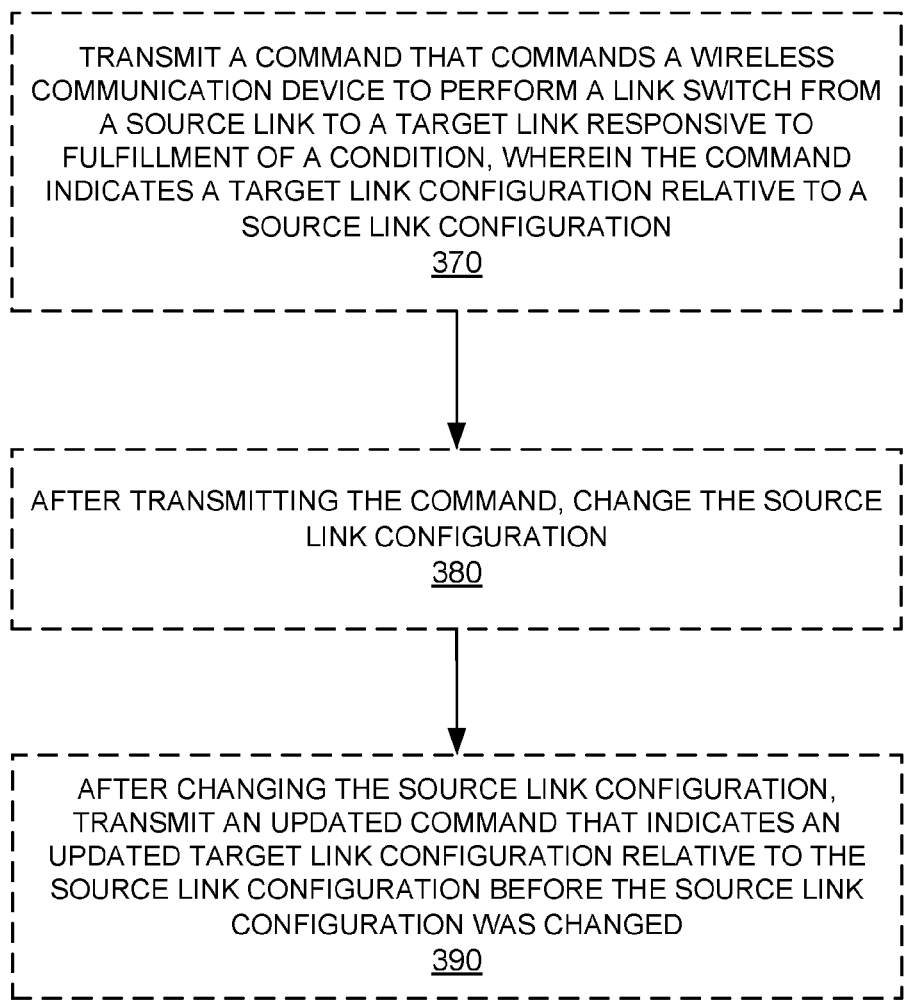
FIG. 6 is a logic flow diagram of a method performed by a network node according to some embodiments.

Also in view of the above modifications and variations, FIG. 6 generally illustrates processing performed by a network node 16 according to some embodiments. As shown, the processing may include transmitting a command 22 that commands a wireless communication device 16 to perform a link switch 24 from a source link 20A to a target link 20B responsive to fulfillment of a condition (Block 370). The command 22 may indicate a target link configuration 26 relative to a source link configuration 28. Processing as shown in FIG. 6 may also include, after transmitting the command 22, changing the source link configuration 28 (Block 380). Moreover, processing may further include, after changing the source link configuration 28, transmitting an updated command that indicates an updated target link configuration relative to the source link configuration before the source link configuration was changed (Block 390).

In some embodiments, the method may also include signaling that the updated command indicates the updated target link configuration relative to the source link configuration before the source link configuration was changed.

Also note that a network node 18 as described above may perform any processing herein, by implementing any functional means or units. In one embodiment, for example, the network node 18 comprises respective circuits or circuitry configured to perform the steps of processing described herein (e.g., signaling). The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7B:
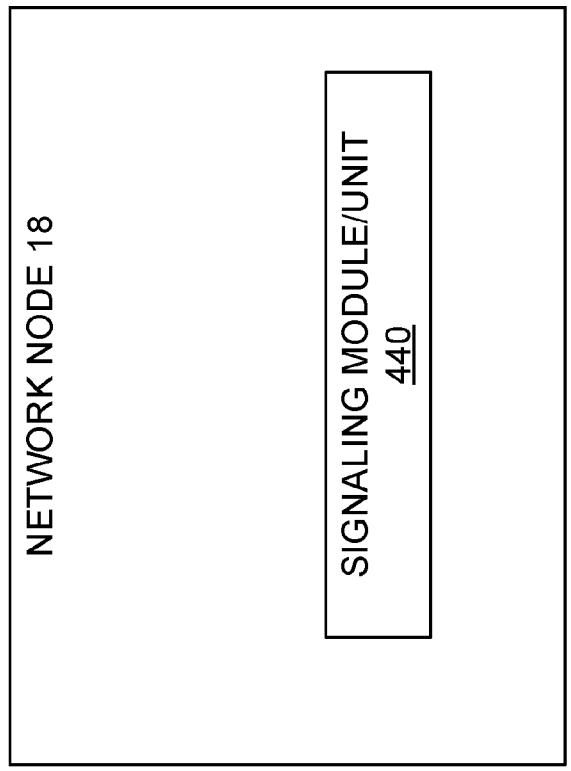
FIG. 7B is a block diagram of a network node according to other embodiments.
Figure 7A:
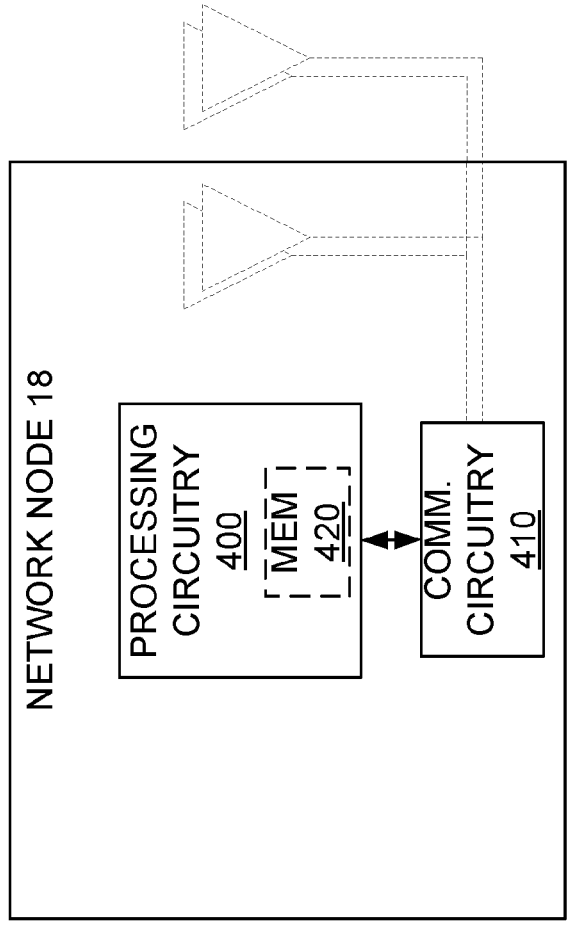
FIG. 7A is a block diagram of a network node according to some embodiments.

FIG. 7A illustrates the network node 18 in accordance with one or more embodiments. As shown, the network node 18 includes processing circuitry 400 and communication circuitry (comm. circuitry) 410. The communication circuitry 410 (e.g., in the form of a transmitter, receiver, transceiver, or radio frequency circuitry) is configured to transmit and/or receive information to and/or from one or more other nodes, e.g., via any communication technology. Where the network node 18 is an access node (e.g., a base station), such communication may occur via one or more antennas that are either internal or external to the network node 18, as shown. The processing circuitry 400 is configured to perform processing described above, such as by executing instructions stored in memory (MEM) 420. The processing circuitry 400 in this regard may implement certain functional means, units, or modules.

FIG. 7B illustrates the network node 18 in accordance with one or more other embodiments. As shown, the network node 18 implements various functional means, units, or modules, e.g., via the processing circuitry 400 in FIG. 7A and/or via software code. These functional means, units, or modules include for instance an signaling module or unit 440 for performing signaling to/from the wireless device 16 as described above.

Those skilled in the art will also appreciate that embodiments herein further include corresponding computer programs.

A computer program comprises instructions which, when executed on at least one processor of a node (e.g., network node 18 or wireless device 16), cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a wireless communication device configured for use in a wireless communication system, the method comprising:
  receiving a command that commands the wireless communication device to perform a link switch from a source link to a target link responsive to fulfillment of a condition, wherein the command indicates a target link configuration relative to a source link configuration;
  storing information from which the target link configuration indicated by the command is determinable irrespective of any change to the source link configuration occurring after receipt of the command; and
  responsive to fulfillment of the condition, performing the link switch from the source link to the target link using the target link configuration as determined from the stored information.

2. The method of claim 1, wherein the command includes relative reconfiguration information that indicates the target link configuration relative to the source link configuration.

3. The method of claim 2, wherein the relative reconfiguration information includes one or more parameter values that are different between the target link configuration and the source link configuration, and excludes one or more parameter values that are the same between the target link configuration and the source link configuration.

4. The method of claim 2, wherein the information from which the target link configuration indicated by the command is determinable comprises the relative reconfiguration information and/or the source link configuration as of when the command is received.

5. The method of claim 1, further comprising, responsive to fulfillment of the condition, determining the target link configuration from the stored information.

6. The method of claim 1:
  further comprising, responsive to receiving the command or responsive to determining that the source link configuration is to be changed, determining the target link configuration indicated by the command; and
  wherein the storing information comprises storing the determined target link configuration as the stored information.

7. The method of claim 1, further comprising, after the storing the information:
  changing the source link configuration; and
  preserving the stored information irrespective of the change to the source link configuration.

8. The method of claim 1, further comprising:
  associating the stored information with the condition, receiving an update to the condition, and updating the condition in accordance with the received update while preserving the stored information and the association of the condition with the stored information; and/or
  associating the stored information with a validity timer for the command, receiving an update to the validity timer, and updating the validity timer in accordance with the received update while preserving the stored information and the association of the validity timer with the stored information.

9. A wireless communication device configured for use in a wireless communication system, the wireless communication device comprising:
  processing circuitry;

memory containing instructions executable by the processing circuitry whereby the wireless communication device is configured to:

receive a command that commands the wireless communication device to perform a link switch from a source link to a target link responsive to fulfillment of a condition, wherein the command indicates a target link configuration relative to a source link configuration;

store information from which the target link configuration indicated by the command is determinable irrespective of any change to the source link configuration occurring after receipt of the command; and responsive to fulfillment of the condition, perform the link switch from the source link to the target link using the target link configuration as determined from the stored information.

10. The wireless communication device of claim 9, wherein the command includes relative reconfiguration information that indicates the target link configuration relative to the source link configuration.

11. The wireless communication device of claim 10, wherein the relative reconfiguration information includes one or more parameter values that are different between the target link configuration and the source link configuration, and excludes one or more parameter values that are the same between the target link configuration and the source link configuration.

12. The wireless communication device of claim 10, wherein the information from which the target link configuration indicated by the command is determinable comprises the relative reconfiguration information and/or the source link configuration as of when the command is received.

13. The wireless communication device of claim 9, wherein the instructions are such that the wireless communication device is configured to, responsive to fulfillment of the condition, determine the target link configuration from the stored information.

14. The wireless communication device of claim 9, wherein the instructions are such that the wireless communication device is configured to:

responsive to receiving the command or responsive to determining that the source link configuration is to be changed, determine the target link configuration indicated by the command; and store the determined target link configuration as the stored information.

15. The wireless communication device of claim 9, wherein the instructions are such that the wireless communication device is configured to, after the storing the information:

change the source link configuration; and preserve the stored information irrespective of the change to the source link configuration.

16. The wireless communication device of claim 9, wherein the instructions are such that the wireless communication device is configured to:

associate the stored information with the condition, receive an update to the condition, and update the condition in accordance with the received update while preserving the stored information and the association of the condition with the stored information; and/or associate the stored information with a validity timer for the command, receive an update to the validity timer, and update the validity timer in accordance with the received update while preserving the stored information and the association of the validity timer with the stored information.

17. A method performed by a network node configured for use in a wireless communication system, the method comprising:

transmitting a command that commands a wireless communication device to perform a link switch from a source link to a target link responsive to fulfillment of a condition, wherein the command indicates a target link configuration relative to a source link configuration;

changing the source link configuration after the transmitting the command; and transmitting, after the changing the source link configuration, an updated command that indicates an updated target link configuration relative to the source link configuration before the source link configuration was changed.

18. The method of claim 17, further comprising signaling that the updated command indicates the updated target link configuration relative to the source link configuration before the source link configuration was changed.

19. The method of claim 17, wherein the command includes relative reconfiguration information that indicates the target link configuration relative to the source link configuration as of when the command is transmitted.

20. The method of claim 19, wherein the relative reconfiguration information includes one or more parameter values that are different between the target link configuration and the source link configuration as of when the command is transmitted, and excludes one or more parameter values that are the same between the target link configuration and the source link configuration as of when the command is transmitted.

21. A network node configured for use in a wireless communication system, the network node comprising:

processing circuitry;

memory containing instructions executable by the processing circuitry whereby the network node is configured to:

transmit a command that commands a wireless communication device to perform a link switch from a source link to a target link responsive to fulfillment of a condition, wherein the command indicates a target link configuration relative to a source link configuration;

change the source link configuration after the transmitting the command; and transmit, after the changing the source link configuration, an updated command that indicates an updated target link configuration relative to the source link configuration before the source link configuration was changed.

22. The network node of claim 21, wherein the instructions are such that the network node is configured to signal that the updated command indicates the updated target link configuration relative to the source link configuration before the source link configuration was changed.

23. The network node of claim 21, wherein the command includes relative reconfiguration information that indicates the target link configuration relative to the source link configuration as of when the command is transmitted.

24. The network node of claim 23, wherein the relative reconfiguration information includes one or more parameter values that are different between the target link configuration and the source link configuration as of when the command is transmitted, and excludes one or more parameter values that are the same between the target link configuration and the source link configuration as of when the command is transmitted.

\* \* \* \* \*